US 7,654,220 B2
Feb. 2, 2010

(12) United States Patent
Yagi et al.

(10) Patent No.: US 7,654,220 B2
(45) Date of Patent: Feb. 2, 2010

(54) INDICATOR

(75) Inventors: Shigeki Yagi, Chiba (JP); Ryuichi Yoshida, Tokyo (JP)

(73) Assignees: Seiko Instruments Inc. (JP); Kisho Electronics Co., Ltd. (JP)

( * ) Notice: Subject to any disclaimer, the term of this patent is extended or adjusted under 35 U.S.C. 154(b) by 351 days.

(21) Appl. No.: 11/705,697

(22) Filed: Feb. 13, 2007

(65) Prior Publication Data

US 2007/0221118 A1 Sep. 27, 2007

(30) Foreign Application Priority Data

Feb. 20, 2006 (JP) .............................. 2006-041909
Feb. 20, 2006 (JP) .............................. 2006-041910

(51) Int. Cl.
*G01D 13/22* (2006.01)
*G01R 5/02* (2006.01)
(52) U.S. Cl. ..................... 116/284; 116/204; 310/36; 310/268; 324/146
(58) Field of Classification Search ................ 116/200, 116/201, 204, 267, 284, 288, 289, 305, 327, 116/328, DIG. 6; 310/15, 21, 36, 39, 268, 310/154.05; 73/866.1, 866.3; 335/222; 324/103 R, 324/115, 116, 142, 146, 151; 336/200, 232; 33/1 PT, 355 R, 361
See application file for complete search history.

(56) References Cited

U.S. PATENT DOCUMENTS

| 2,637,762 | A | * | 5/1953 | Lunas ........................ 324/137 |
| 2,855,887 | A | * | 10/1958 | Mumford et al. ............ 116/284 |
| 3,611,222 | A | * | 10/1971 | Sauvignet et al. ........... 335/212 |
| 4,206,406 | A | * | 6/1980 | Scannell et al. ......... 324/154 R |
| 4,253,062 | A | * | 2/1981 | Scannell et al. ............. 324/150 |
| 5,062,135 | A | * | 10/1991 | Ohike .................... 324/154 R |
| 5,138,968 | A | * | 8/1992 | Ohike ........................ 116/294 |
| 5,267,526 | A | * | 12/1993 | Totsuka ...................... 116/291 |
| 5,319,527 | A | * | 6/1994 | Murphy et al. ................ 362/26 |
| 5,630,373 | A | * | 5/1997 | Kato et al. .................. 116/288 |

* cited by examiner

*Primary Examiner*—Amy Cohen Johnson
(74) *Attorney, Agent, or Firm*—Adams & Wilks

(57) ABSTRACT

An indicator has a permanent magnet and a coil rotatably supported on the permanent magnet and wound so as to form a surface that is parallel to and disposed at a preselected distance from a bottom surface of the permanent magnet. The coil generates a torque by interaction with a magnetic field of the permanent magnet upon supply of a current to the coil. An indicator needle is mounted to undergo rotation with the coil through a range of angles corresponding to indicator angles of the indicator needle. A pair of spiral springs urge the indicator needle in a direction opposite to a direction of the torque to undergo rotation through the range of indicator angles. The pair of spiral springs comprise a first spiral spring connected at one end thereof to one end of the coil and a second spiral spring connected at one end thereof to another end of the coil. The first spiral spring is larger than the second spiral spring and is arranged on an outer peripheral side of and coaxially with the second spiral spring so that the first and second spiral springs lie on a common plane.

19 Claims, 9 Drawing Sheets

INDICATOR

BACKGROUND OF THE INVENTION

1. Field of the Invention

The present invention relates to an indicator, for example, to an indicator for presenting an output value as an analog meter value.

2. Description of the Related Art

Indication of a measured value by using a meter is widely performed. Due to recent advancement of digitalization, examples of a meter portion of such a measuring device include a meter portion realizing digital display of a measured numerical value, and a meter portion simulatory displaying an indicator on a liquid crystal display. However, there are many users who supports a meter portion in which indication is physically performed by an indicator needle on a scale plate, and a great number of the meter portions of this construction is manufactured even now.

A conventional meter portion will be described with reference to FIG. 9. FIG. 9A is a front view of the meter portion, and FIG. 9B is a side view thereof.

A meter portion 103 is used, for example, for a tuning device, and displays a pitch level or the like by an indication angle of an indicator needle 113 in an analogue fashion.

A permanent magnet 117 is fixed to a zero arm 153. A portion where the fixing is performed is not shown. The permanent magnet has a cylindrical shape and is magnetized in a direction perpendicular to a central shaft 118.

A coil 115 is wound around the permanent magnet 117 such that a magnetic field is generated in the direction perpendicular to the central shaft 118. The coil 115 is supported so as to be rotatable together with the indicator needle 113 about the central shaft 118.

On sides of both surfaces of the coil 115, in spaces between ends of the zero arm 153 and the coil 115, a first spiral spring 111 and a second spiral spring 112 are respectively arranged so as to be coaxial with the central shaft 118.

One end of the first spiral spring 111 is connected to a connection terminal 123 provided on the zero arm 153 and the other end thereof is connected to a connection terminal 124 provided on the coil 115.

On the other hand, one end of the second spiral spring 112 is connected to a connection terminal 121 provided on the zero arm 153 and the other end thereof is connected to a connection terminal 122 provided on the coil 115.

Both the first spiral spring 111 and the second spiral spring 112 urge the coil 115 in a direction opposite to a direction in which the indicator needle 113 swings.

The first spiral spring 111 and the second spiral spring 112 function as flow passages for supplying a current to the coil 115. The flow passage of the current is formed of a circuit including the connection terminal 123, the first spiral spring 111, the connection terminal 124, the coil 115, the connection terminal 122, the second spiral spring 112, and the connection terminal 121 in the stated order.

When the current flows through the coil 115, there is generated a torque for rotating the coil 115 about the central shaft 118 due to the magnetic field of the permanent magnet 117. The indicator needle 113 stops at apposition where the torque is balanced with an urging force of the first spiral spring 111 and the second spiral spring 112.

Recent development in thinning of the measuring device involves an increasing demand for a thinner meter portion. For the thinning technique, there is proposed an indicator disclosed in Japanese Utility Model Application Laid-open No. 62-34370.

According to this technique, the coil 115 is formed through printing on a substrate, thereby making the coil 115 thin.

However, with this technique, it is difficult to manufacture the coil 115 which satisfies conditions such as a torque. Therefore, the indicator with this technique has not been put into practical use.

SUMMARY OF THE INVENTION

It is therefore an object of the present invention to make an indicator thinner.

According to the present invention, to achieve the above-mentioned object, there is provided an indicator, characterized by including: a fixing member having two connection terminals formed thereon; a cylindrical permanent magnet fixed to the fixing member; a coil which is rotatably supported on the fixing member, for generating a torque by interacting with a magnetic field of the permanent magnet; an indicator needle which rotates together with the coil; a first spiral spring connected at one end thereof to one of the connection terminals and connected at another end thereof to one end of the coil, for urging the indicator needle in a direction opposite to a direction of the torque; and a second spiral spring formed on the same plane as the first spiral spring, and connected at one end thereof to the other one of the connection terminals and connected at another end thereof to another end of the coil, for urging the indicator needle in the direction opposite to the direction of the torque (first structure).

In the first structure, a structure may be achieved such that the first spiral spring is arranged on an outer peripheral side of the second spiral spring and coaxially with the second spiral spring; and each of the first spiral spring and the second spiral spring is fixed to the fixing member and the coil so that an inner diameter of the first spiral spring increases and an outer diameter of the second spiral spring decreases in a case where the indicator needle rotates in the direction of the torque (second structure).

In the first structure or second structure, a structure may be achieved such that the permanent magnet has magnetic domains of different polarities magnetized in an axial direction and formed alternately to each other; and the coil is wound to form a surface parallel to a bottom surface of the permanent magnet at a predetermined distance from the bottom surface (third structure).

Further, according to the present invention, to achieve the above-mentioned object, there is provided an indicator, characterized by including: a disk-like permanent magnet in which magnetic domains of different polarities magnetized in an axial direction are formed alternately to each other; a fixing member for fixing the permanent magnet; a coil which is rotatably supported on a center line of the permanent magnet by the fixing member and is wound to form a surface parallel to a bottom surface of the permanent magnet at a predetermined distance from the bottom surface; an indicator needle which rotates together with the coil; and a spiral spring fixed at one end thereof to the fixing member and fixed at another end thereof to the coil, for urging the indicator needle in a direction opposite to a direction of a torque generated with respect to the coil by a magnetic field of the permanent magnet.

According to the present invention, the indicator can be thinned by, for example, reducing the number of portions where the clearances are needed between components in the indicator.

DETAILED DESCRIPTION OF THE PREFERRED EMBODIMENTS (1) Outline of Embodiment

Figure 2A:
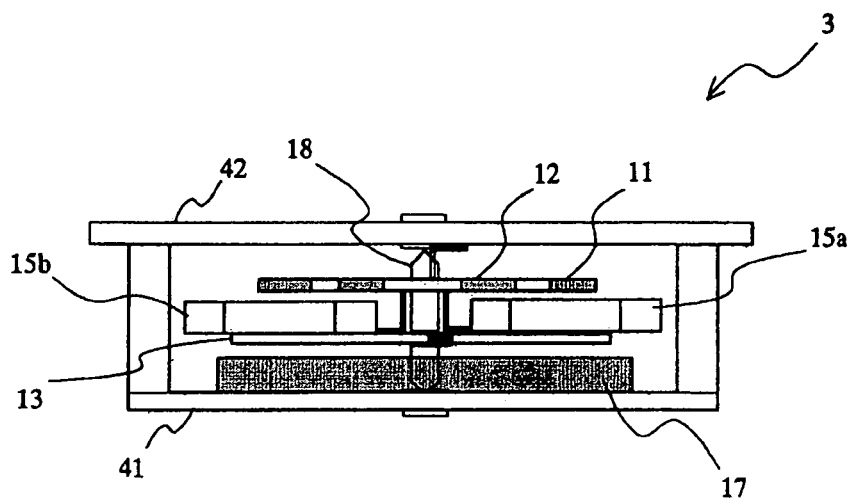
FIGS. 2A-2C are views for illustrating a structure of a meter portion according to an embodiment of the present invention.

A permanent magnet 17 of a meter portion 3 shown in FIG. 2A has a disc shape provided with a hole formed in a center thereof, and is magnetized in an axial direction of a central shaft 18. Magnetic domains are formed in a bottom surface of the permanent magnet 17 so that one side thereof becomes North pole and the other side thereof becomes South pole.

Coils 15a and 15b are wound on the same plane so as to form surfaces parallel to the bottom surface of the permanent magnet 17. The coils 15a and 15b are arranged at a predetermined interval from the permanent magnet 17 on one side of the bottom surface of the permanent magnet 17.

An outer spiral spring 11 and an inner spiral spring 12 are formed in helical shapes on the same plane. Each of those spiral springs is fixed to a bridge 42 at one end thereof and is fixed to a coil 15 at the other end. The outer and inner spiral springs urge the coil 15 in a direction opposite to a direction in which an indicator needle 13 (which rotates about the central shaft 18 together with the coil 15) swings.

As described above, in the meter portion 3, the permanent magnet 17 is magnetized in a direction perpendicular to the bottom surface of the permanent magnet 17, the coils 15a and 15b are formed on the same plane, and the outer spiral spring 11 and the inner spiral spring 12 are formed on the same plane, thereby realizing thinning of the meter portion 3 by making each member thinner and reducing the number of portions where clearances between components are required.

(2) Details of Embodiment

Figure 1:
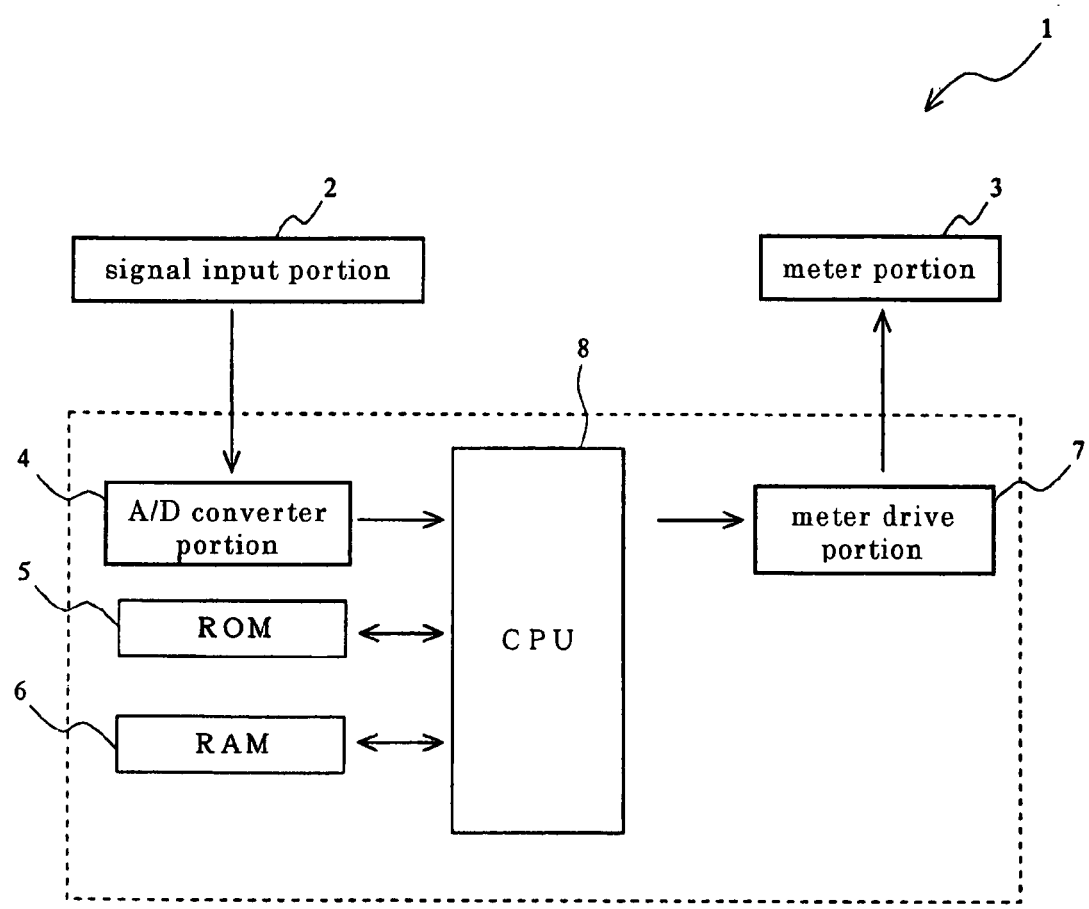
FIG. 1 is a block diagram showing a structure of a measuring device according to an embodiment of the present invention.

FIG. 1 is a block diagram showing a structure of a measuring device according to an embodiment of the present invention.

A measuring device 1 is a device which obtains analogue data through measurement, for displaying the data by an analogue meter, that is, for example, a tuning device for displaying a pitch level of an instrument as a meter value. In addition, there may be proposed various measuring devices for displaying a noise level, or a current value or a voltage value as an ammeter or a voltmeter.

The measuring device 1 is composed of a signal input portion 2, a meter portion 3, an A/D converter portion 4, a read only memory (ROM) 5, a random access memory (RAM) 6, a central processing unit (CPU) 8, a meter drive portion 7, and the like.

The signal input portion 2, which includes a microphone, detects a sound generated by an instrument and outputs the detected sound to the A/D converter portion 4 as an analogue value.

The A/D converter portion 4 converts the analogue value detected by the signal input portion 2 into a digital value to input the digital value to the CPU 8.

The CPU 8, which is a central control unit, analyzes distribution of a frequency by, for example, Fourier transformation of the digital value obtained through conversion by the A/D converter portion 4, and outputs a pitch signal indicating the pitch to the meter drive portion 7.

The meter drive portion 7 converts the pitch signal outputted by the CPU 8 into the analogue value and supplies a current corresponding to the pitch to the meter portion 3.

The meter portion 3 is driven so that the indicator needle forms a predetermined indication angle according to the current supplied from the meter drive portion 7. As a result, the pitch is presented to the user by the indicator needle.

The ROM 5, which is a read-only storage medium, stores a program for the CPU 8 to analyze the pitch, a program for controlling the measuring device 1 as a whole, and the like.

The RAM 6 provides a working area for the CPU 8 in performing information processing according to the program.

Next, with reference to FIG. 2, a structure of the meter portion 3 (indicating device) will be explained.

FIG. 2A shows a view of the meter portion 3 seen from a direction perpendicular to a rotation axis of the indicator needle.

The permanent magnet 17 is a disk-shaped magnet having a hole formed in a central portion thereof, and is fixed to a frame 41.

In this case, the disk shape is a concept included in a barrel shape. The barrel shape which has a small thickness is particularly called a disk shape.

Figure 2B:
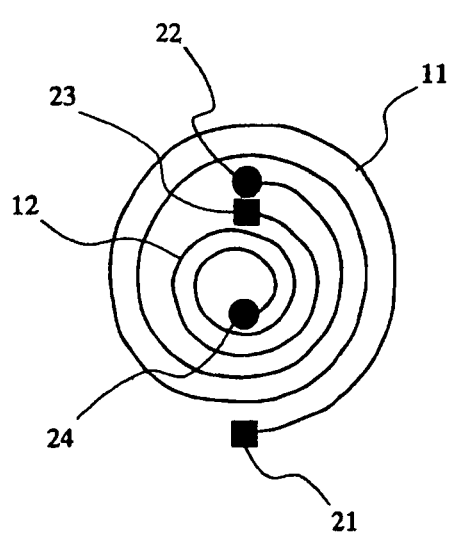
Figure 2C:
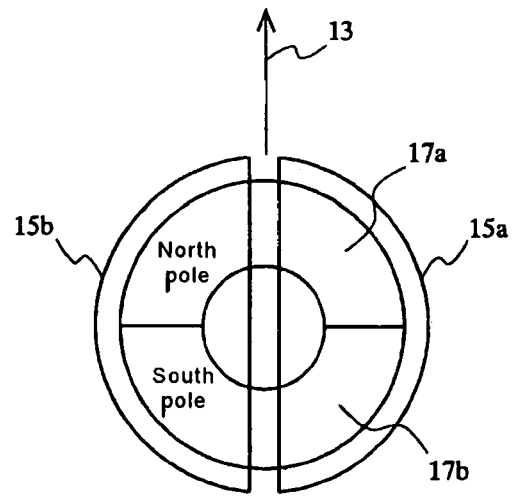

The permanent magnet 17 is, as shown in FIG. 2C, formed by combining two permanent magnets 17a and 17b which are obtained by bisecting the disk shape.

Both the permanent magnets 17a and 17b are magnetized in the axial direction of the central shaft 18 (that is, the direction perpendicular to the bottom surface of the disk shape), and are combined with each other such that different magnetic poles are adjacent to each other.

As described above, the permanent magnet 17 is formed such that North pole and South pole are adjacent to each other at the bottom surface thereof and magnetic domains of different magnetic poles are alternately arranged along a periphery of the disk shape.

Between the frame 41 of FIG. 2A and the bridge 42, the indicator needle 13 and the coils 15a and 15b are fixed to the central shaft 18 while being integrated with one another.

The central shaft 18 is supported by a bearing formed on the frame 41 and the bridge 42 so as to be rotatable about an axis thereof.

As shown in FIG. 2C, the coil 15a and the coil 15b are wound in a half-moon shape so that surfaces formed by the coils 15a and 15b (hereinafter, referred to as coil 15 when no differentiation is made) become parallel to the bottom surface of the permanent magnet 17.

The coils 15a and 15b are connected in series. Each of the coil 15a and the coil 15b has a connection terminal formed thereon, for supplying a current.

Between the coil 15 of FIG. 2A and the bridge 42, there are arranged the outer spiral spring 11 (first spiral spring) and the inner spiral spring 12 (second spiral spring).

In this case, with reference to FIG. 2B, the arrangement of the outer spiral spring 11 and the inner spiral spring 12 will be described.

The outer spiral spring 11 and the inner spiral spring 12 are formed on the same plane so that the centers of those are located on the central shaft 18.

The outer spiral spring 11 is connected at one end thereof to a connection terminal 21 formed on the bridge 42 (more strictly, the connection terminal 21 is formed on a zero arm 53 shown in FIG. 5 described later, which is provided on the bridge 42, but here, is defined to be on the bridge 42 for convenience), and is connected at the other end thereof to a connection terminal 22 of the coil 15b.

On the other hand, the inner spiral spring 12 is connected at one end thereof to the other connection terminal 23 formed on the bridge 42, and is connected at the other end thereof to a connection terminal 24 of the coil 15a.

In this case, the bridge 42, the frame 41, and the zero arm (not shown) constitute a fixing member fixed to the measuring device 1.

Both the outer spiral spring 11 and the inner spiral spring 12 urge the indicator needle 13 in a direction opposite to a direction of the torque generated between the coil 15 and the permanent magnet 17.

That is, the outer spiral spring 11 and the inner spiral spring 12 have a function of a conductor for supplying a current to the coil 15 in addition to a function as urging means for urging the indicator needle 13.

Next, with reference to FIG. 3, the outer spiral spring 11 and the inner spiral spring 12 will be described in more detail.

Each of the outer spiral spring 11 and the inner spiral spring 12 is structured by forming a belt made of an elastic material in a helical shape.

Figure 3A:
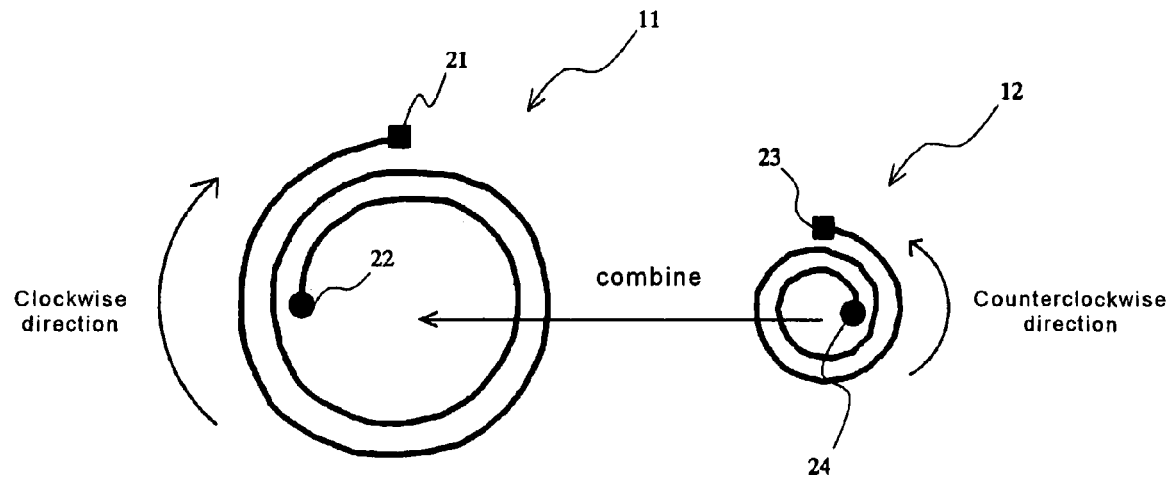
FIGS. 3A-3B are views for illustrating an outer spiral spring and an inner spiral spring.

As shown in FIG. 3A, the outer spiral spring 11 has a radius increasing in a clockwise direction, and the inner spiral spring 12 has a radius increasing in a counterclockwise direction.

Note that, the directions of the helixes are set as described above in a case where the indicator needle swings in a clockwise direction. In a case where the indicator needle swings in a counterclockwise direction, the directions of the helixes become opposite to those.

Figure 3B:
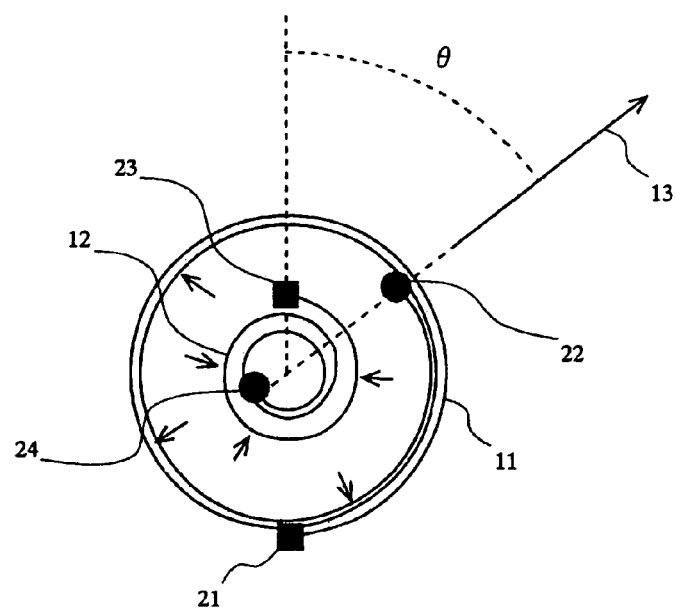

When the directions of the helixes of the outer spiral spring 11 and the inner spiral spring 12 are set in the above-mentioned manner, as shown in FIG. 3B, when the indicator needle swings in a θ direction, an inner diameter of the outer spiral spring 11 increases and an outer diameter of the inner spiral spring 12 decreases.

Thus, when the indicator needle swings, it is possible to prevent the outer spiral spring 11 and the inner spiral spring 12 from interfering with each other.

Next, a difference between the torque caused by the coil 15 and the permanent magnet 17 of the present invention and the torque caused by the conventional coil and permanent magnet will be described.

Figure 4A:
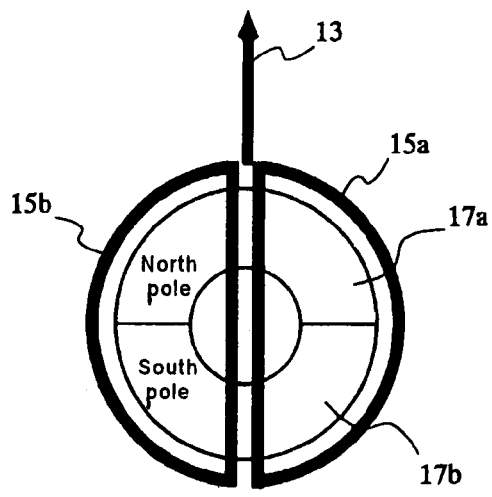
FIGS. 4A-4D are diagrams for illustrating relationships between a current and an indication angle.

FIG. 4A shows positional relationships between the coil 15 and the permanent magnet 17 according to this embodiment in cases before (left drawing) and after (right drawing) swinging of the indicator needle 13. Note that, in the right drawing, the direction of the torque generated in a linear portion of the coil 15 is indicated by arrows (vector).

When a current is caused to flow through the coils 15a and 15b, due to an interaction between a magnetic field generated by the coil 15 and a magnetic field generated by the permanent magnet 17, a force is applied to various portions of the coil 15. The torque contributing to the rotation of the indicator needle 13, to which the coil 15 is fixed, about the central shaft 18 is generated in directions shown on each of linear portions of the coils 15a and 15b, and magnitude of the torque is proportional to a magnitude of a current caused to flow through the coil 15.

At a position where the torque balances a force applied by the outer spiral spring 11 and the inner spiral spring 12 in a direction opposite to the rotation direction of the indicator needle 13, the indicator needle 13 stops while maintaining the indication angle θ.

A spring constant of each of the outer spiral spring 11 and the inner spiral spring 12 is considered to be constant regardless of the indication angle of the indicator needle 13. Therefore, a current I supplied to the coil 15 and the indication angle θ of the indicator needle 13 are proportional to each other.

Figure 4B:
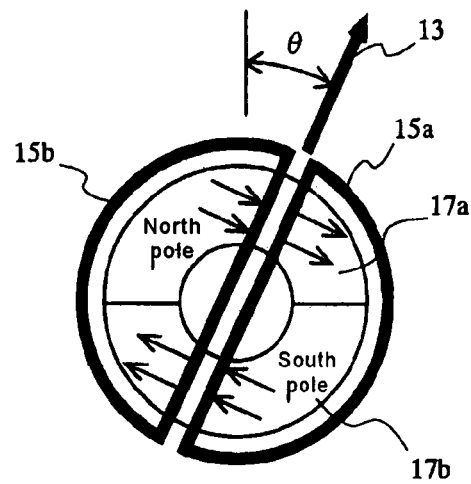
Figure 4C:
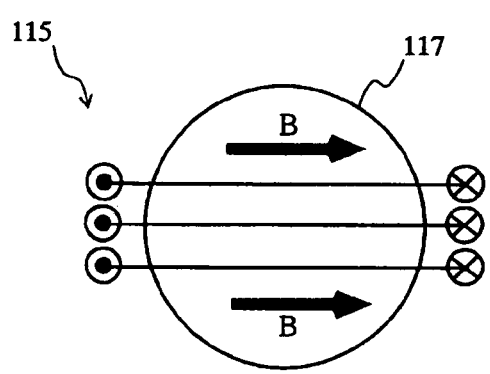
Figure 4D:
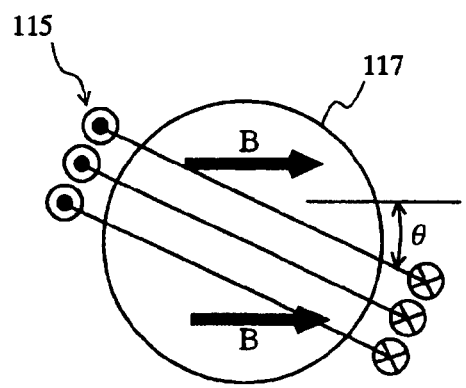

FIG. 4B shows positional relationships between the coil 115 and the permanent magnet 117 in the meter portion 103 of the conventional example in cases before (left drawing) and after (right drawing) swinging of the indicator needle.

In this case, a torque F acting on the coil 115 is represented by $nIBS\sin\theta$. The symbol n represents the number of winds of the coil, the symbol I represents a current, the symbol B represents a magnetic flux density, and the symbol θ represents the indication angle.

Accordingly, in the conventional meter portion 103, the relationship between the current and the indication angle is not a linear relationship. Therefore, a circuit for adjusting a current value and for realizing an output which has the linear relationship with the indication angle is mounted to the conventional meter portion 103.

As described above, in this embodiment, since the relationship between the current value of the coil 15 and the indication angle θ is the linear relationship, the circuit for adjusting the current value as in the conventional example is not necessary.

Figure 5:
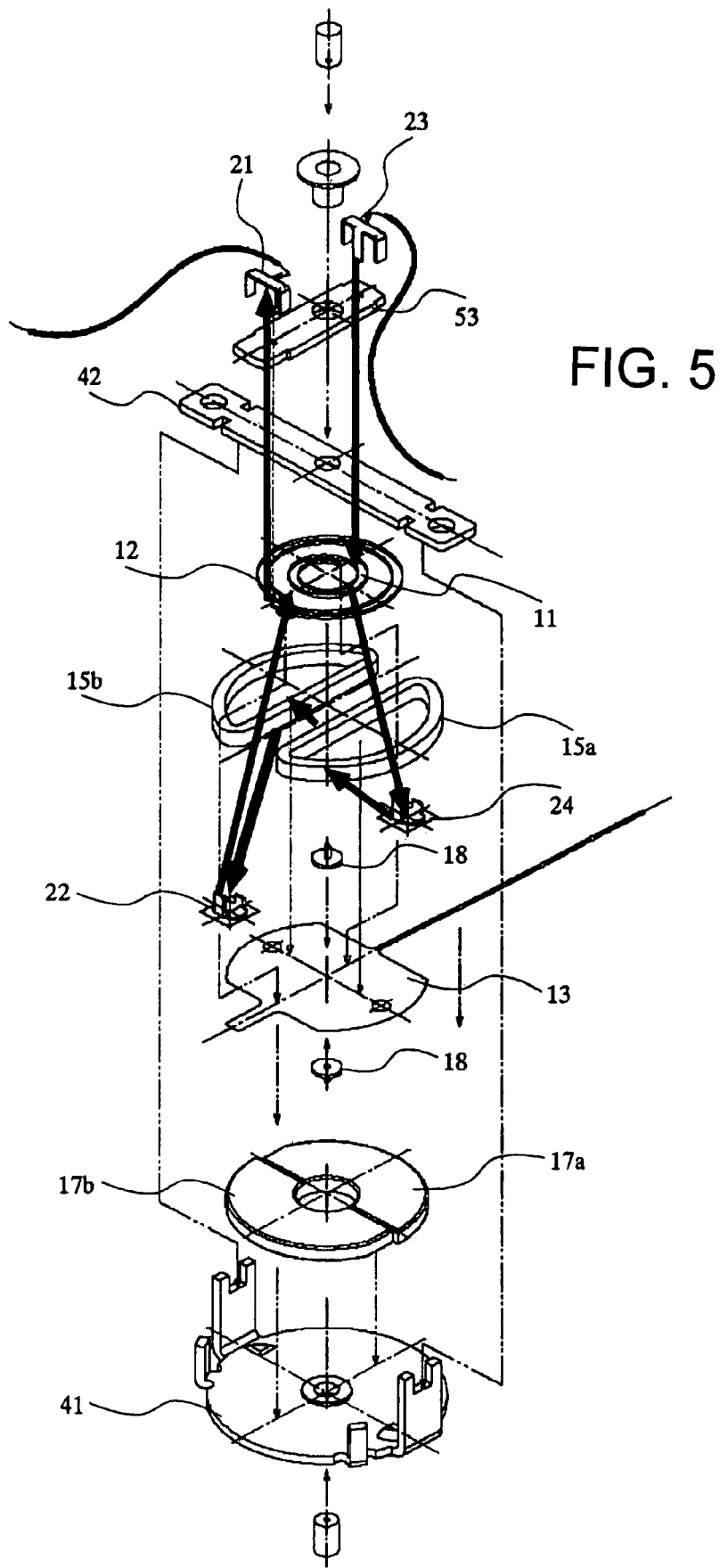
FIG. 5 is an assembly drawing of the meter portion.

FIG. 5 is an assembly drawing of the meter portion 3. A current flow passage is indicated by a thick line.

The connection terminal 23 and the connection terminal 21 are fixed to the zero arm 53. The zero arm 53 is fixed to the bridge 42. The bridge 42 is fixed to the frame 41.

On the other hand, the coils 15a and 15b are fixed to the indicator needle 13 together with the connection terminals 24 and 22. The indicator needle 13 is rotatably supported by a bearing of the frame 41 and the bridge 42 by using the central shaft 18.

The current flow passage is formed of a circuit including the connection terminal 23, the inner spiral spring 12, the connection terminal 24, the coil 15a, the coil 15b, the connection terminal 22, the outer spiral spring 11, and the connection terminal 21 in the stated order. A direction of a current caused to flow in the current flow passage depends on a direction in which the indication angle of the indicator needle 13 is rotated.

As described above, in this embodiment, two spiral springs are formed on the same plane, thereby thinning the meter portion 3. The permanent magnet 17 is magnetized in the axial direction of the central shaft 18, and the coil is wound to form a plane parallel to the bottom surface of the permanent magnet 17, thereby further thinning the meter portion 3.

Further, the meter portion 3 is more resistant to the impact than the conventional meter portion 103.

For example, when the meter portion 3 falls down and an impact is applied thereto, the permanent magnet 17 and the coil 15 are thinner and less in volume than the permanent magnet 117 and the coil 115, so there is less possibility of deformation of components occurring and less possibility of the central shaft 118 being detached from the bearing as compared to the meter portion 103. Further, with regard to the structure, there are less number of portions where deformations occur as compared to the meter portion 103. Further, the meter portion 3 is thin, so it is higher in strength than the meter portion 103.

MODIFIED EXAMPLE 1

Figure 6A:
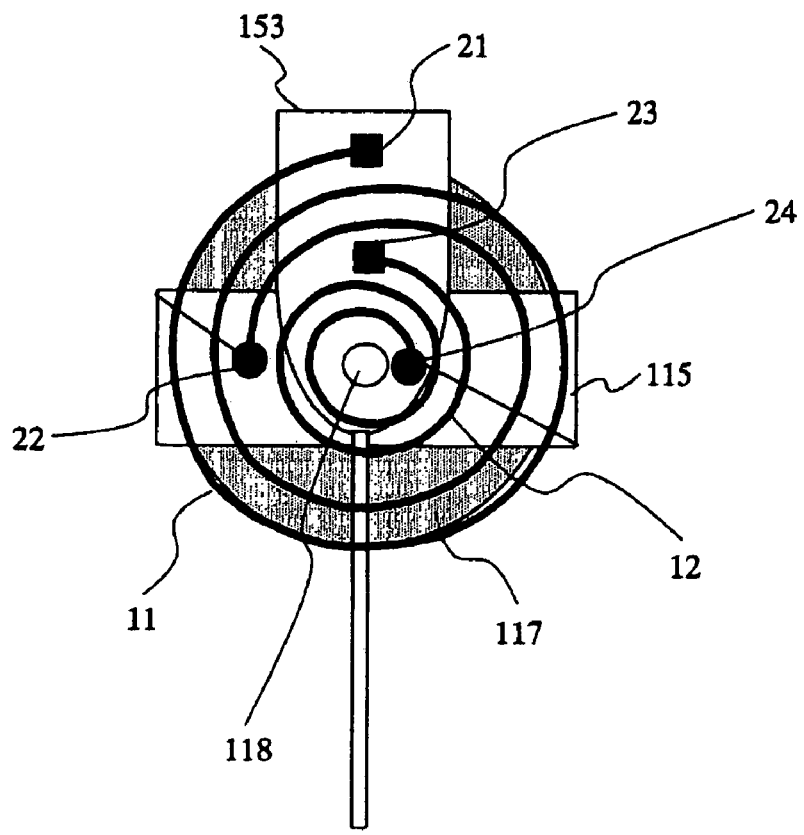
FIGS. 6A-6B are views for illustrating Modified Example 1.
Figure 6B:
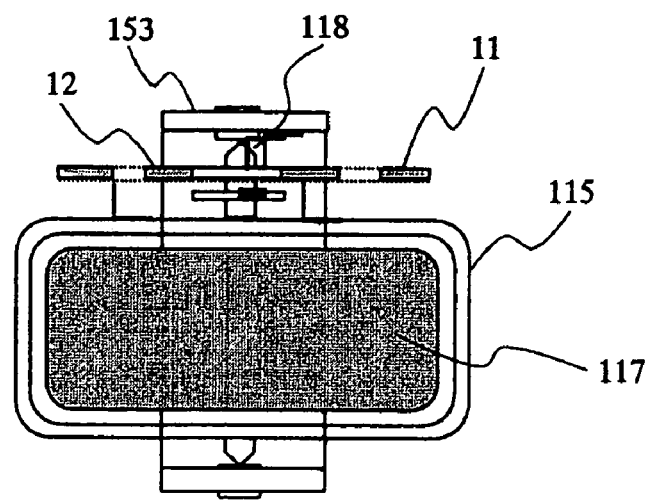

Next, Modified Example 1 of this embodiment will be described with reference to FIG. 6.

In this example, the spiral springs of the meter portion 3 is applied to the meter portion 103 according to the conventional example.

Components corresponding to those of the meter portion 103 and the meter portion 3 are denoted by reference numerals which are identical to those used in the above-mentioned embodiment, and descriptions of those will be simplified or omitted.

In this modified example, on one bottom surface side of the permanent magnet 117, the outer spiral spring 11 and the inner spiral spring 12 are arranged at a predetermined distance from the bottom surface coaxially with the central shaft 118.

The outer spiral spring 11 is fixed to the zero arm 153 by the connection terminal 21 and is fixed to the coil 115 by the connection terminal 22.

The inner spiral spring 12 is fixed to the zero arm 153 by the connection terminal 23 and is fixed to the coil 115 by the connection terminal 24.

The current flow passage is a circuit including the connection terminal 21, the outer spiral spring 11, the connection terminal 22, the coil 115, the connection terminal 24, the inner spiral spring 12, and the connection terminal 23 in the stated order.

MODIFIED EXAMPLE 2

Figure 7A:
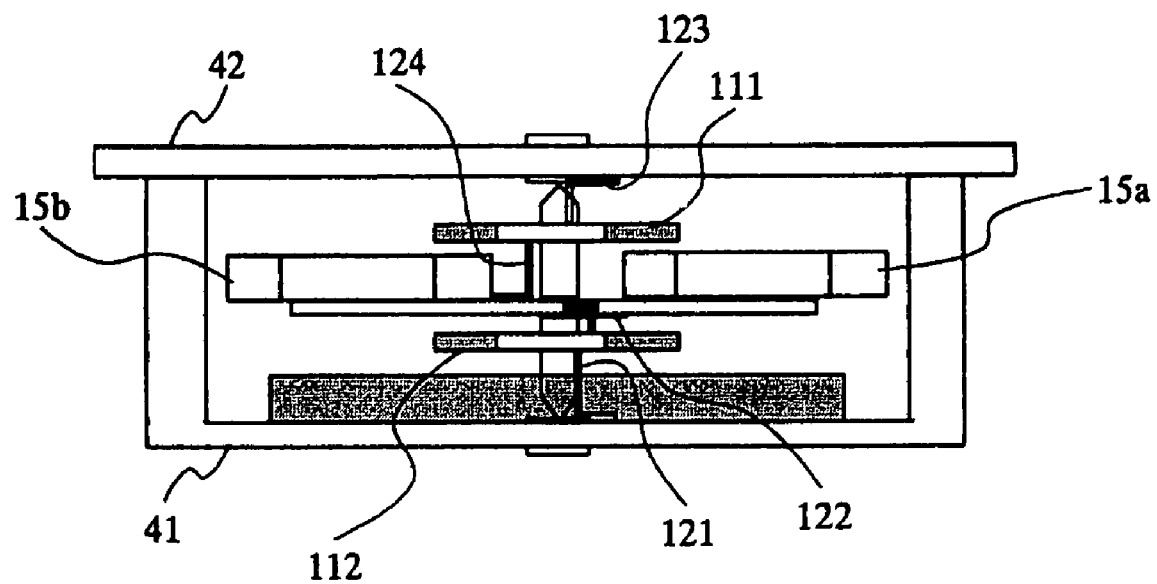
FIGS. 7A-7B are views for illustrating Modified Example 2.
Figure 7B:
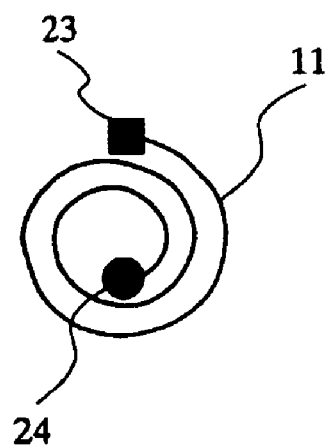

Next, Modified Example 2 of this embodiment will be described with reference to FIG. 7.

According to this example, in the meter portion 3 described in this embodiment, the first spiral spring 111 and the second spiral spring 112 of the conventional example are arranged on both sides of bottom surfaces of the coil 15, respectively.

Components corresponding to those of the meter portion 103 and the meter portion 3 are denoted by reference numerals which are identical to those used in the above-mentioned embodiment, and descriptions of those will be simplified or omitted.

In this modified example, on one side of the bottom surface of the permanent magnet 17, the first spiral spring 111 is arranged at a predetermined interval therefrom, and on the other side of the bottom surface of the permanent magnet 17, the second spiral spring 112 is arranged at the predetermined interval therefrom.

The first spiral spring 111 is fixed to the bridge 42 by the connection terminal 123 and is fixed to the coil 15b by the connection terminal 124.

The second spiral spring 112 is fixed to the frame 41 by the connection terminal 121 and is fixed to the coil 15a by the connection terminal 122.

The current flow passage is a circuit including the connection terminal 123, the first spiral spring 111, the connection terminal 124, the coil 15b, the coil 15a, the connection terminal 122, the second spiral spring 112, and the connection terminal 121 in the stated order.

FIG. 8 are views for comparing portions where clearances between components are required according to this embodiment and Modified Examples 1 and 2. Each of the portions where the clearances are required is indicated by a numeral in a circle.

Figure 8A:
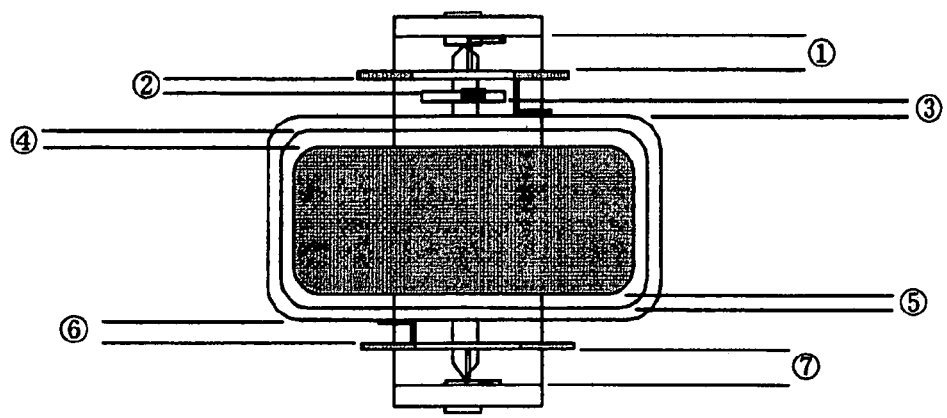
FIGS. 8A-8D are views for illustrating portions where clearances are required.

FIG. 8A shows the meter portion 103 according to the conventional example. As shown in FIG. 8A, the meter portion 103 includes seven portions where the clearances are required.

Figure 8B:
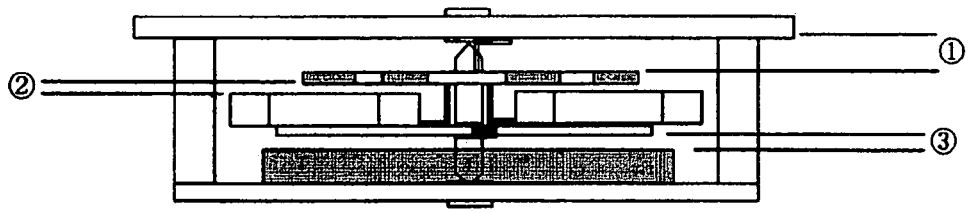

FIG. 8B shows the meter portion 3 according to this embodiment. As shown in FIG. 8B, the meter portion 3 includes three portions where the clearances are required.

In the meter portion 3, the number of the portions where the clearances are required is less by four as compared to the meter portion 103. This is because the coil 15 is formed on the same plane on one side of the bottom surface of the permanent magnet 17 and the outer spiral spring 11 and the inner spiral spring 12 are arranged on the same plane on one side of the coil 15.

Since there are few portions where the clearances are required and the permanent magnet 17 is thinner than the permanent magnet 117, the meter portion 3 can be formed to be thinner.

Figure 8C:
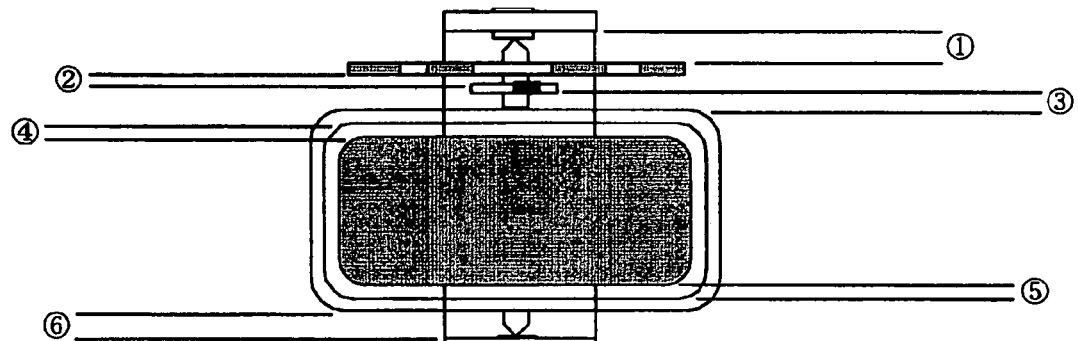

FIG. 8C shows the meter portion according to Modified Example 1, including six portions where the clearances are required. In Modified Example 1, the meter portion is made thinner than that of the conventional example by arranging the spiral spring on one surface of the coil 115.

Figure 8D:
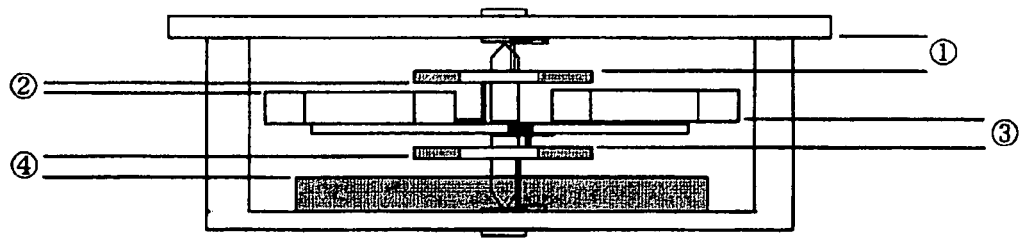
Figure 9A:
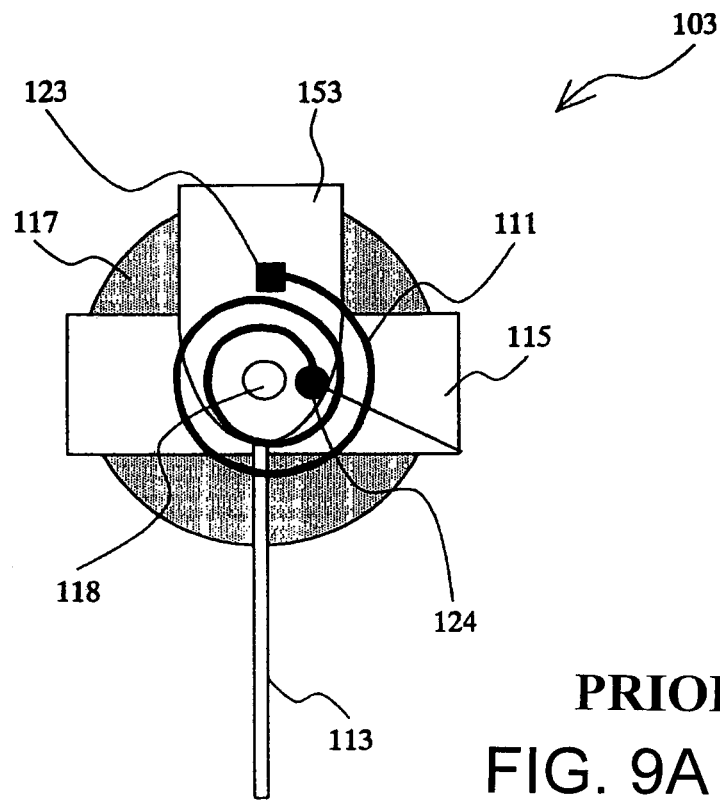
FIGS. 9A-9B are views for illustrating a conventional example.
Figure 9B:
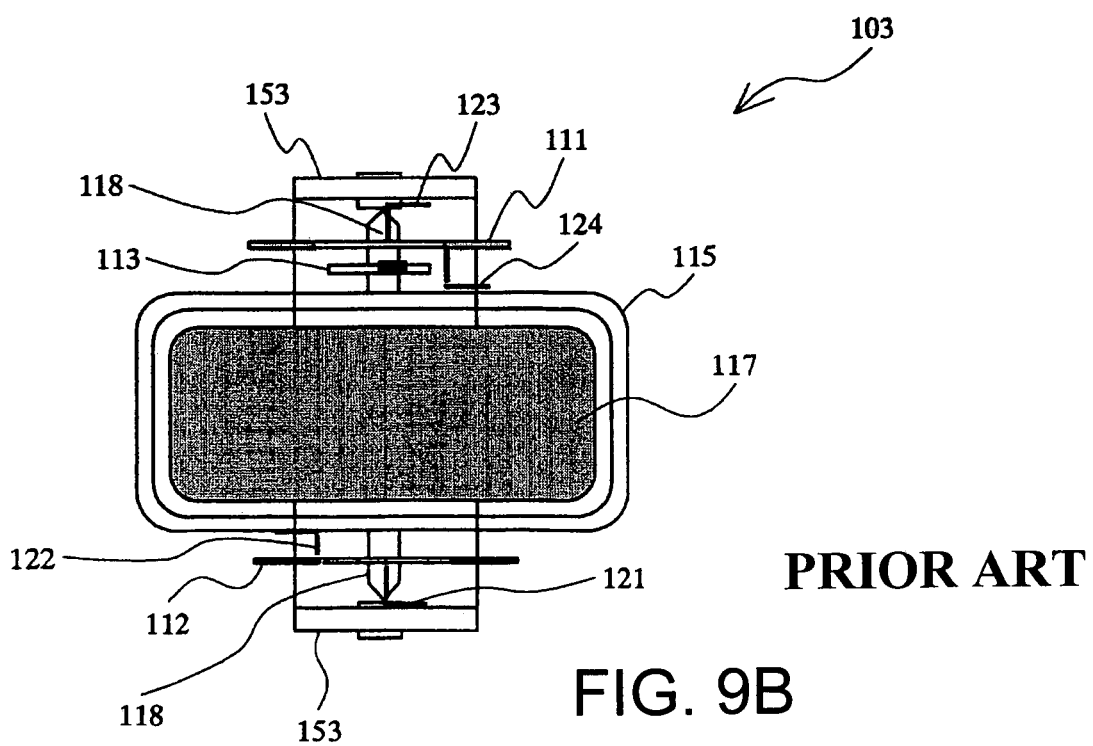

FIG. 8D shows the meter portion according to Modified Example 2, including four portions where the clearances are required.

In Modified Example 2, the permanent magnet 17 is made thinner than that of the conventional example and the coil 15 is arranged on one side of the permanent magnet 17, thereby thinning the meter portion.

According to this embodiment as described above, the following effects can be obtained.

(1) The permanent magnet 17 is magnetized in a direction perpendicular to the bottom surface thereof, thereby making it possible to arrange the coil 15 on the bottom surface of the permanent magnet 17.

(2) Accordingly, the meter portion 3 can be made thinner, and the relationship between the current supplied to the coil 15 and the indication angle of the indicator needle 13 can be made linear.

(3) Since the outer spiral spring 11 and the inner spiral spring 12 are formed on the same plane, the number of portions where the clearances are required for arrangement of the spiral springs is reduced, thereby making it possible to make the meter portion 3 thinner.

(4) In the meter portion 3, there are fewer portions which are deformed when being applied with an impact, so the meter portion 3 becomes more resistant to an impact.

Further, according to this embodiment, there is provided an indicator, characterized by including: a fixing member having two connection terminals formed thereon; a cylindrical permanent magnet fixed to the fixing member; a coil which is rotatably supported on the fixing member, for generating a torque by interacting with a magnetic field of the permanent magnet; an indicator needle which rotates together with the coil; a first spiral spring connected at one end thereof to one of the connection terminals and connected at another end thereof to one end of the coil, for urging the indicator needle in a direction opposite to a direction of the torque; and a second spiral spring formed on the same plane as the first spiral spring, and connected at one end thereof to the other one of the connection terminals and connected at another end thereof to another end of the coil, for urging the indicator needle in the direction opposite to the direction of the torque (first structure).

In the first structure, a structure may be achieved such that the first spiral spring is arranged on an outer peripheral side of the second spiral spring and coaxially with the second spiral spring; and each of the first spiral spring and the second spiral spring is fixed to the fixing member and the coil so that an inner diameter of the first spiral spring increases and an outer diameter of the second spiral spring decreases in a case where the indicator needle rotates in the direction of the torque (second structure).

In the first structure or second structure, a structure may be achieved such that the permanent magnet has magnetic domains of different polarities magnetized in an axial direction and formed alternately to each other; and the coil is wound to form a surface parallel to a bottom surface of the permanent magnet at a predetermined distance from the bottom surface (third structure).

Further, according to this embodiment, there is provided an indicator, characterized by including: a disk-like permanent magnet in which magnetic domains of different polarities magnetized in an axial direction are formed alternately to each other; a fixing member for fixing the permanent magnet; a coil which is rotatably supported on a center line of the permanent magnet by the fixing member and is wound to form a surface parallel to a bottom surface of the permanent magnet at a predetermined distance from the bottom surface; an indicator needle which rotates together with the coil; and a spiral spring fixed at one end thereof to the fixing member and fixed at another end thereof to the coil, for urging the indicator needle in a direction opposite to a direction of a torque generated with respect to the coil by a magnetic field of the permanent magnet.

What is claimed is:

1. An indicator comprising:
   a fixing member having two connection terminals formed thereon;
   a permanent magnet fixed to the fixing member;
   a coil rotatably supported on the fixing member for generating a torque by interacting with a magnetic field of the permanent magnet;
   an indicator needle mounted to undergo rotation with the coil;
   a first spiral spring connected at one end thereof to one of the connection terminals of the fixing member and connected at another end thereof to one end of the coil for urging the indicator needle in a direction opposite to a direction of the torque generated by the interaction between the coil and the magnetic field of the permanent magnet; and
   a second spiral spring disposed on the same plane as the first spiral spring and connected at one end thereof to the other one of the connection terminals of the fixing member and connected at another end thereof to another end of the coil for urging the indicator needle in the direction opposite to the direction of the torque generated by the interaction between the coil and the magnetic field of the permanent magnet, the first spiral spring being larger than the second spiral spring and being arranged on an outer peripheral side of and coaxially with the second spiral spring.

2. An indicator according to claim 1; wherein each of the first spiral spring and the second spiral spring is fixed to the fixing member and the coil so that an inner diameter of the first spiral spring increases and an outer diameter of the second spiral spring decreases in a case where the indicator needle rotates in the direction of the torque.

3. An indicator according to claim 1; wherein the permanent magnet has magnetic domains of different polarities magnetized in an axial direction and formed alternately to each other; and wherein the coil is wound to form a surface parallel to and disposed at a predetermined distance from a bottom surface of the permanent magnet.

4. An indicator according to claim 1; wherein the indicator needle undergoes rotation through a range of angles corresponding to indicator angles of the indicator needle; wherein the coil generates the torque by interacting with a magnetic field of the permanent magnet upon supply of a current to the coil; and wherein a spring constant of each of the first and second spiral springs remains constant regardless of the indicator angle of the indicator needle so that the current supplied to the coil and the indicator angle are proportional to each other.

5. An indicator according to claim 1; wherein the permanent magnet is cylindrical-shaped.

6. An indicator according to claim 1; wherein the permanent magnet comprises a disk-shaped body having magnetic domains of different polarities magnetized in an axial direction and formed alternately to each other.

7. An indicator according to claim 1; wherein the coil is rotatably supported on a center line of the permanent magnet by the fixing member and is wound so as to form a surface that is parallel to and disposed at a preselected distance from a bottom surface of the permanent magnet.

8. A measuring device comprising:
   a detecting portion that detects a sound generated by an instrument and that outputs the detected sound as a first analogue value;
   an A/D converter portion that converts the analogue value to a digital value;
   a control unit that analyzes a frequency of the digital value and outputs a pitch signal corresponding to a pitch of the frequency of the digital value;
   an indicator according to claim 1; and
   a drive portion that converts the pitch signal into a second analogue value and that supplies a current corresponding to the second analogue value to the coil of the indicator to generate the torque by interaction with the magnetic field of the permanent magnet to thereby rotate the indicator needle in the direction of the torque to indicate the pitch.

9. A measuring device according to claim 8; wherein each of the first spiral spring and the second spiral spring of the indicator is fixed to the fixing member and the coil of the indicator so that an inner diameter of the first spiral spring increases and an outer diameter of the second spiral spring decreases when the indicator needle rotates in the direction of the torque to indicate the pitch.

10. A measuring device according to claim 8; wherein the indicator needle undergoes rotation through a range of angles corresponding to indicator angles of the indicator needle that indicate the pitch; wherein the coil generates the torque by interacting with a magnetic field of the permanent magnet upon supply of a current to the coil; and wherein a spring constant of each of the first and second spiral springs remains constant regardless of the indicator angle of the indicator needle so that the current supplied to the coil and the indicator angle are proportional to each other.

11. A measuring device according to claim 8; wherein each of the first spiral spring and the second spiral spring is fixed to the fixing member and the coil so that an inner diameter of the first spiral spring increases and an outer diameter of the second spiral spring decreases in a case where the indicator needle rotates in the direction of the torque.

12. An indicator comprising:
a permanent magnet;
a coil rotatably supported on the permanent magnet and wound so as to form a surface that is parallel to and disposed at a preselected distance from a bottom surface of the permanent magnet, the coil generating a torque by interaction with a magnetic field of the permanent magnet upon supply of a current to the coil;
an indicator needle mounted to undergo rotation with the coil through a range of angles corresponding to indicator angles of the indicator needle; and
a pair of spiral springs that urge the indicator needle in a direction opposite to a direction of the torque to undergo rotation through the range of indicator angles, the pair of spiral springs comprising a first spiral spring connected at one end thereof to one end of the coil and a second spiral spring connected at one end thereof to another end of the coil, the first spiral spring being larger than the second spiral spring and being arranged on an outer peripheral side of and coaxially with the second spiral spring so that the first and second spiral springs lie on a common plane.

13. An indicator according to claim 12; wherein the first and second spiral springs are connected to the coil so that during rotation of the indicator needle through the range of indicator angles, an inner diameter of the first spiral spring increases and an outer diameter of the second spiral spring decreases.

14. An indicator according to claim 12; wherein the permanent magnet has magnetic domains of different polarities magnetized in an axial direction and formed alternately to each other.

15. An indicator according to claim 12; wherein a spring constant of each of the first and second spiral springs remains constant regardless of the indicator angle indicated by the indicator needle so that the current supplied to the coil and the indicator angle are proportional to each other.

16. An indicator according to claim 12; wherein the permanent magnet is cylindrical-shaped.

17. An indicator according to claim 12; wherein the permanent magnet comprises a disk-shaped body having magnetic domains of different polarities magnetized in an axial direction and formed alternately to each other.

18. An indicator according to claim 12; wherein the coil is rotatably supported on a center line of the permanent magnet.

19. A measuring device comprising:
a detecting portion that detects a sound generated by an instrument and that outputs the detected sound as a first analogue value;
an A/D converter portion that converts the analogue value to a digital value;
a control unit that analyzes a frequency of the digital value and outputs a pitch signal corresponding to a pitch of the frequency of the digital value;
an indicator according to claim 12; and
a drive portion that converts the pitch signal into a second analogue value and that supplies a current corresponding to the second analogue value to the coil of the indicator to generate the torque by interaction with the magnetic field of the permanent magnet to thereby rotate the indicator needle to one of the indicator angles to indicate the pitch.

\* \* \* \* \*